(12) United States Patent
Tessiereau et al.

(10) Patent No.: US 11,649,738 B2
(45) Date of Patent: May 16, 2023

(54) BYPASS TURBOMACHINE

(71) Applicant: SAFRAN AIRCRAFT ENGINES, Paris (FR)

(72) Inventors: Antonin Etienne Diego Tessiereau, Moissy-Cramayel (FR); Cyrille François Antoine Mathias, Moissy-Cramayel (FR); Wouter Balk, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 69 days.

(21) Appl. No.: 17/273,898

(22) PCT Filed: Sep. 4, 2019

(86) PCT No.: PCT/FR2019/052041
§ 371 (c)(1),
(2) Date: Mar. 5, 2021

(87) PCT Pub. No.: WO2020/049256
PCT Pub. Date: Mar. 12, 2020

(65) Prior Publication Data
US 2021/0317755 A1 Oct. 14, 2021

(30) Foreign Application Priority Data

Sep. 5, 2018 (FR) ........................ 1857974

(51) Int. Cl.
*F01D 25/28* (2006.01)
*F01D 25/00* (2006.01)
(Continued)

(52) U.S. Cl.
CPC ............... *F01D 25/28* (2013.01); *F01D 9/02* (2013.01); *F01D 25/005* (2013.01); *F01D 25/24* (2013.01);
(Continued)

(58) Field of Classification Search
CPC ........ F01D 25/24; F01D 25/246; F01D 25/28; F01D 25/04; F02C 7/045
See application file for complete search history.

(56) References Cited

U.S. PATENT DOCUMENTS 10,253,800 B2 * 4/2019 Sarazin ................... F16B 5/065
2002/0159829 A1 10/2002 Kruger et al.
2016/0326911 A1 * 11/2016 Karafillis ................ F01D 25/28

FOREIGN PATENT DOCUMENTS

EP 3178801 A1 6/2017
FR 3029980 A1 6/2016
WO WO 2016184620 A1 11/2016

OTHER PUBLICATIONS

International Patent Application No. PCT/FR2019/052041, International Search Report and Written Opinion dated Dec. 20, 2019, 10 pgs.

(Continued)

*Primary Examiner* — Topaz L. Elliott
*Assistant Examiner* — Cameron A Corday
(74) *Attorney, Agent, or Firm* — Cozen O'Connor

(57) ABSTRACT

The invention relates to an assembly for a turbomachine with a longitudinal axis comprising a first annular wall (24), panels (38) being arranged around the longitudinal axis (A) and extending radially opposite said first annular wall (24) so as to form a flow surface for a flow of air, each panel (38) being secured to the first annular wall (24) by at least one fixing member (72) passing through an orifice in the panel (38) and secured to the first annular wall (24) by means of a sleeve and a stud forming a spacer.

19 Claims, 3 Drawing Sheets

(51) Int. Cl.
*F01D 25/24* (2006.01)
*F01D 9/02* (2006.01)
(52) U.S. Cl.
CPC .... *F05D 2240/14* (2013.01); *F05D 2250/231* (2013.01); *F05D 2250/232* (2013.01); *F05D 2260/31* (2013.01); *F05D 2260/606* (2013.01); *F05D 2300/603* (2013.01)

(56) References Cited

OTHER PUBLICATIONS

French Patent Application No. 1857974; Search Report dated May 23, 2019; 10 pages.

\* cited by examiner

BYPASS TURBOMACHINE

CROSS-REFERENCE TO RELATED APPLICATIONS

This application is a 35 U.S.C. § 371 filing of International Application No. PCT/FR2019/052041 filed Sep. 4, 2019, which claims the benefit of priority to French Patent Application No. 1857974 filed Sep. 5, 2018, each of which is incorporated herein by reference in its entirety.

TECHNICAL FIELD

The present invention concerns an assembly for a turbomachine and intended to delimit an annular surface of an annular air stream, in particular a secondary annular air stream.

BACKGROUND

FIG. 1 represents the upstream part of a bypass turbomachine 10 with longitudinal axis A comprising, from upstream AM to downstream AV, an upstream fan wheel 12, a low-pressure compressor 14 and an intermediate casing 16. Classically, the intermediate casing 16 is connected to the fan casing 17 by a radially outer annular flange and to the high-pressure compressor (not shown) by a radially inner annular flange at its hub 19. The incoming air flow is separated by an annular spout 18 into a primary air flow entering the interior of the low-pressure compressor 14 and a secondary air flow circulating around the compressor in an annular secondary air stream 20, which is delimited radially inward by a succession of annular walls or annular wall elements.

In particular, we observe the presence of an annular shroud 22 formed by a first annular wall 24 and a second annular wall 26. The second annular wall 26 carries stator vanes 28 designed to straighten the air flow coming out of the fan wheel 12. As shown in FIG. 2, this annular shroud 22 comprises an annular step 30 extending radially inward and continuing downstream by the first annular wall 24 which is substantially cylindrical in shape and which is connected to a radial annular flange 32 for bolting 34 to an annular flange 36 of the intermediate casing 16. This direct attachment of the annular shroud 22 supporting the straightening vanes 28 to the intermediate casing 16 ensures a good transmission of forces on the stator vanes 28 to the intermediate casing 16, which provides part of the mechanical connection of the turbomachine to the aircraft.

To reconstitute a radially inner annular air flow surface for the annular secondary air stream at intermediate casing 16, a plurality of panels 38 are juxtaposed circumferentially one after the other between radial arms 40 of intermediate casing 16. Each panel 38 has a downstream end 42 bolted to intermediate casing 16 and an upstream end 44 joined to the first annular wall 24 and extending downstream from the second annular wall 26. The plurality of panels 38 thus extend radially opposite the annular wall 24. To maintain the spacing between the upstream end 44 of a panel 38 and the first annular wall 24, it is known to make several bosses 46 on the radially inner face of panel 38. These bosses 46 rest on the radially outer face of the first wall 24. They are each crossed from the outside by a screw 48 screwed into a nut 50 riveted to the annular wall.

This method of fixation is very practical to implement but suffers from a major difficulty relative to the additional mass required for the boss 46. In addition, the realization of the metal panels 38 also proves to be relatively heavy.

A solution has been proposed and consists in making the 38 panels in composite material comprising resin-impregnated carbon fibers. In terms of mass, this proves to be positive. However, the realization of the bosses 46 increases the draping time. In addition, the implementation is complex and the development of the heating mold is also complicated because the heating for thermosetting must be controlled at any point of a boss 46.

The invention thus aims to provide a simple and effective solution to this problem.

SUMMARY OF THE INVENTION

This document firstly concerns an assembly for a turbomachine with a longitudinal axis comprising a first annular wall, panels being arranged around the longitudinal axis and extending radially opposite said first annular wall so as to form a flow surface for an air flow, each panel being attached to the first annular wall by at least one fastening member passing through a hole in the panel and attached to the first annular wall, characterized in that a bushing is inserted in each orifice and comprises a first annular end portion applied to a face of the periphery of the orifice opposite the first annular wall, the fixing member clamping said first annular end portion of the bushing to the periphery of the orifice, a stud forming a spacer surrounding the bushing and being clamped radially between the periphery of the orifice and the first annular wall.

Thus, the proposed assembly makes it possible to produce panels without bosses which are replaced by studs structurally independent of the panels. The studs ensure the remote fixing of the panels on the first annular wall. The panels can thus be made of carbon fiber composite material embedded in a thermosetting matrix such as an epoxy resin. The design of the panels then follows a standard and simple manufacturing process without requiring the introduction of a complex and time-consuming excess thickness.

In addition, the clamping force of each fastener passes through the first annular end portion of each bushing into the circumference of the hole, into the stud, and is transmitted to the first annular wall. Thus, when the panel is made of composite material as indicated above, the force is then well distributed annularly around the hole and in the stud, which leads to a good mechanical strength and a good service life of the proposed fastener.

Another feature is that each bushing may include a second annular end portion opposite the first annular end portion and arranged radially opposite a corresponding surface of the stud for retention of the stud on the panel.

This assembly also ensures that each stud is locked radially between the bushing and a panel. Thus, the studs can be made integral with the panel, which can be manipulated with the stud and the bushings pre-arranged at each hole for fixing to the first annular wall.

Also, the bushing may include a cylindrical portion for joining the first annular end portion and the second annular end portion.

The second annular end portion of the bushing may have a wall thickness less than the wall thickness of the cylindrical portion so as to allow crimp deformation of the second annular end portion used to retain the stud. Wall thickness means the radial dimension of the wall constituting either part of the bushing. Thus, to carry out the assembly of the bushing, the bushing initially comprises the first annular end portion, the cylindrical portion and a second annular end portion which is cylindrical. One can then insert the bushing into a hole in the panel, mount the stud around the bushing and finally deform the second annular end portion by crimping so that it ensures that the stud is held on the panel. The panel thus equipped with the stud and the bushing can be easily handled and placed opposite the first annular wall.

According to another characteristic, each first annular end portion of a bushing forms a frustoconical frustoconicalskirt applied on a frustoconical part of the perimeter of the hole of the panel. In this way, when the fasteners include a head, this one can be housed in the radial inward recess formed by the frustoconical part of the periphery of the hole and avoid protruding into an annular air stream.

Also, the frustoconical part of the hole periphery of the panel is extended by a cylindrical annular rim whose free end is arranged at a distance from the stud, the frustoconical conical part of the panel periphery being clamped between the first annular end part of the bushing and the stud.

In this way, it is ensured that the contact between the stud and the panel is made on the periphery of the hole and not at the free end of the radial cylinder. Thus, the transmission of the clamping forces is done through the part of the stud that clamps the frustoconical part.

The first annular end portion and the second annular end portion of the bushing can each form a skirt of approximately frustoconical shape.

The bushing and stud can be mounted with a play L in radial translation relative to the panel, L being of the order of a tenth of a millimeter.

In addition, the assembly described above may comprise an annular shroud formed by the first annular wall arranged downstream of a second annular wall and connected to the latter by a radial annular step, each panel being arranged around the longitudinal axis and extending in the downstream extension of the second upstream annular wall of the annular shroud so as to delimit a flow surface for an annular air flow.

This document also relates to a double-flow turbomachine comprising an assembly in which the second annular wall carries radially outwardly extending stator vanes, the first annular wall being attached to an intermediate casing to which the downstream end of each panel is also attached, the second annular wall and the panels delimiting radially inwardly an annular flow path of a secondary air flow.

Also, each panel can be arranged circumferentially between radial arms of the intermediate casing.

The invention will be better understood and other details, characteristics and advantages of the invention will appear when reading the following description made as a non-limitative example with reference to the appended drawings.

DETAILED DESCRIPTION

Figure 3:
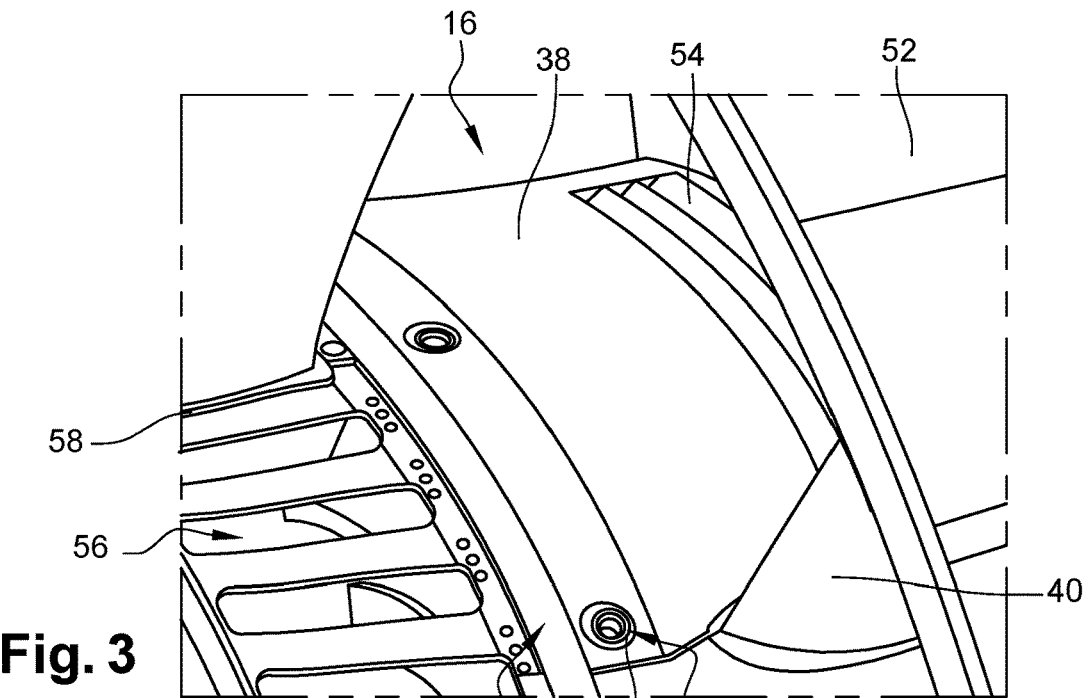
FIG. 3 is a schematic perspective view of a set according to the invention.

First of all, we refer to FIG. 3 which represents an assembly according to the invention intended to be mounted in a turbomachine 10. More specifically, FIG. 3 represents an intermediate casing 16 which is a structural part of the turbomachine 10 and is used to transmit the thrust forces from the turbomachine 10 to the aircraft via a pylon.

This intermediate casing 16 comprises an inner annular shroud (not shown) from which extend radial arms 40 connected at their radially outer ends to an outer annular shroud 52. In practice, the inner annular shroud is covered externally by panels 38 each circumferentially interposed between two radial arms 40 of intermediate casing 16. Each panel 38 has openings or slots 54 formed in its downstream part for the passage of air from the annular primary air stream, which is well known to the skilled person in the art.

Figure 1:
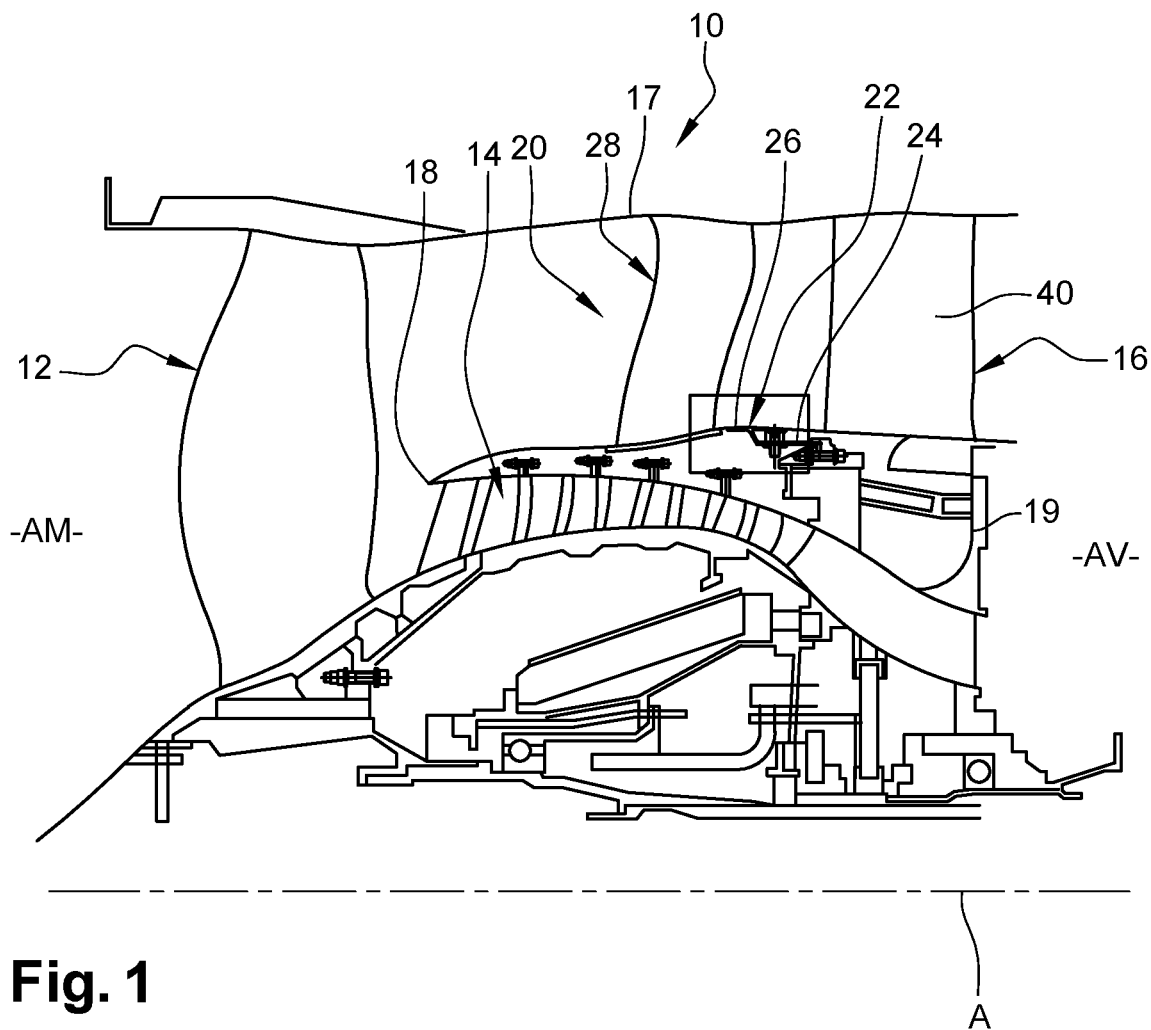
FIG. 1, already described previously, is a schematic axial section view of the upstream part of a turbomachine.
Figure 2:
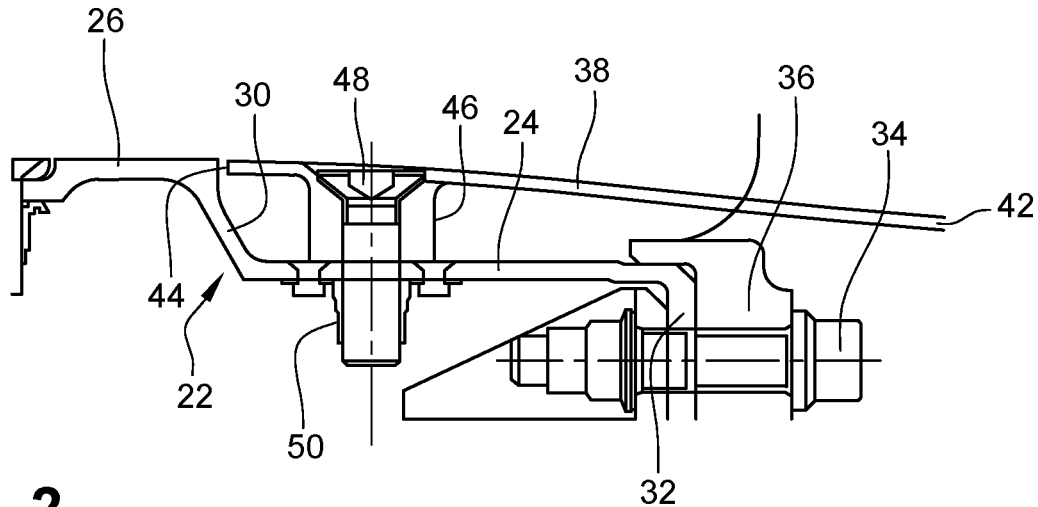
FIG. 2, already described earlier, is a larger scale view of the area delineated by the dotted line in FIG. 1.

An upstream annular shroud 22 allows the support of stator blades 28 used to straighten the air exiting an upstream fan 12 as described in reference to FIG. 1. This annular shroud 22 comprises a first downstream annular wall 24 connected to a second upstream annular wall 26 by a radial annular step 30. The second upstream annular wall 26 comprises openings 56 oblong in longitudinal direction A and each crossed by a baseplate 58 for fixing a stator vane 28 for straightening the air flow. The downstream end of the first annular downstream wall 24 is bolted 34 to the inner annular shroud of the intermediate casing 16.

Figure 4:
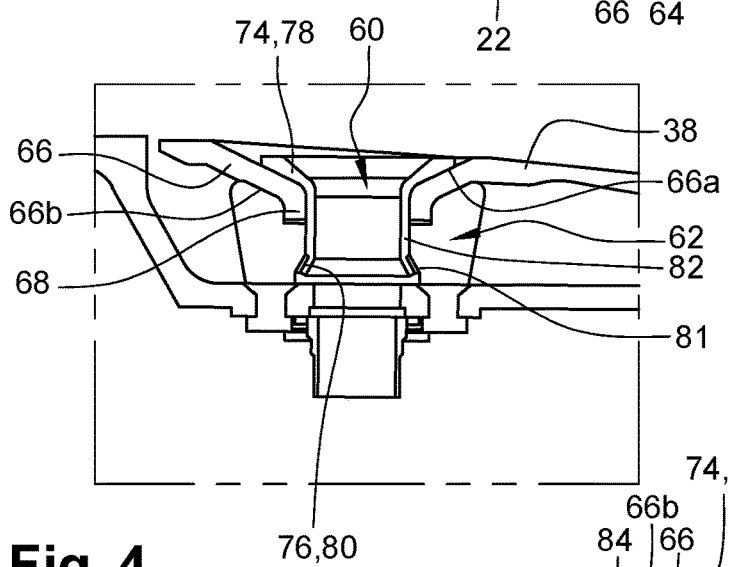
FIG. 4 is a schematic cross-sectional view of the attachment of a panel to a first annular wall as shown in FIG. 3, with the fastener not visible.
Figure 5:
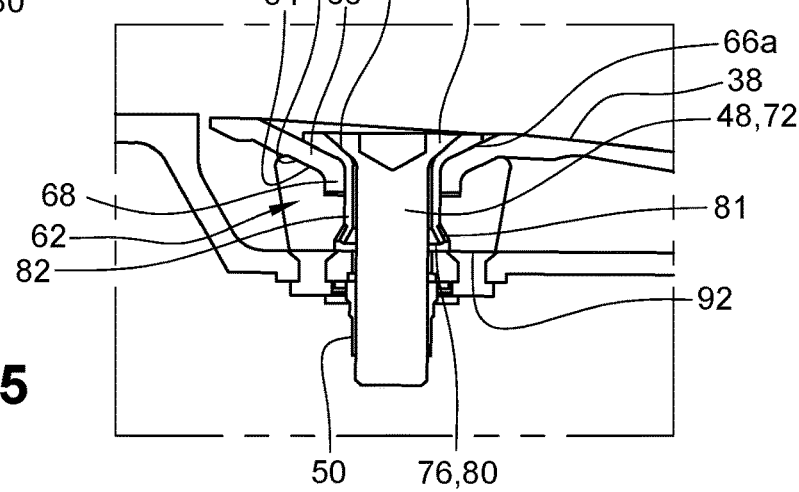
FIG. 5 is a schematic cross-sectional view of the attachment of a panel to a first annular wall as shown in FIG. 3, with the fastener visible.
Figure 6:
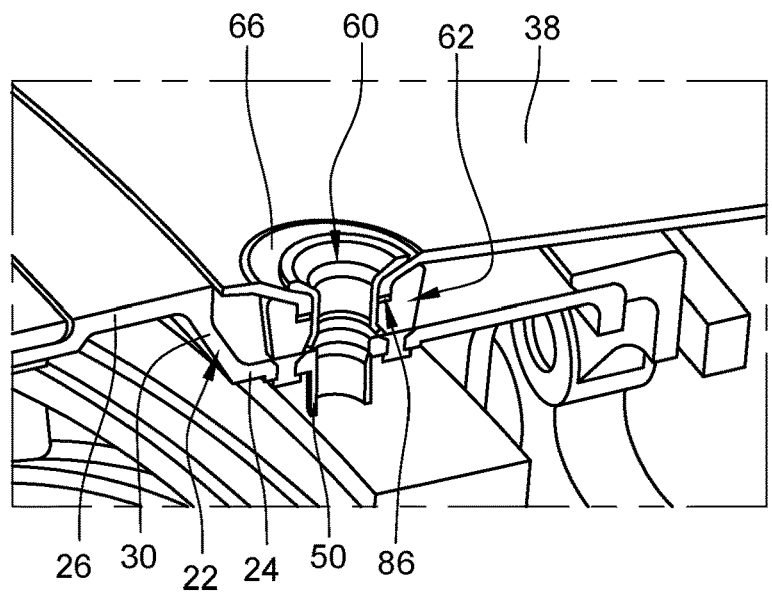
FIG. 6 is a schematic cross-sectional perspective view similar to FIG. 4.

As can be seen in FIGS. 4 and 5, the upstream end of each panel 38 is attached to the first annular wall 24 of the upstream annular shroud 22 and extends in the downstream extension of the second annular wall 26 to reconstitute a radially inner annular flow surface of a secondary air stream.

For this purpose, it is necessary that each panel 38 is arranged at a predetermined distance from the first annular wall 24. This can be difficult to achieve when the panels are made of carbon fiber composite material embedded in a thermosetting resin matrix, such as epoxy.

The invention proposes to fix each panel 38 to the first radial annular wall 24 by means of a bushing 60 and a stud 62 arranged according to a specific configuration so as to have a good transmission of forces.

Thus, each panel 38 comprises a plurality of holes 64 whose periphery has a part of substantially frustoconical shape 66 flared radially outward and extending at its radially inner end by a cylindrical annular rim of substantially radial axis 68. The frustoconical part 66 of the periphery of the hole 64 makes it possible to accommodate the head 70 of a fastening device 72 such as a screw 48 so that the latter does not protrude into the annular secondary air stream 20.

An intermediate bushing 60 is mounted in each hole 64 and comprises a first annular end portion 74 arranged at a radially outer end of the bushing 60 and a second annular end portion 76 arranged opposite the first annular end portion 74 and thus arranged in position in the turbomachine radially at the inner end of the bushing 60. The first annular end portion 74 and the second annular end portion 76 present in the embodiment represented in FIGS. 4 to 8 the shape of a frustoconical skirt 78, 80 widening, respectively, radially towards the outside and radially towards the inside. The first portion 74 annular of end and the second portion 76 annular of end are connected one to the other by a cylindrical annular portion 82. It can be seen that the second annular end portion 76 of bushing 60 has a wall thickness e1 less than the wall thickness e2 of cylindrical portion 82 so as to allow crimp deformation of the second annular end portion 76 used to retain stud 62. This difference in thickness is best seen in FIG. 8 showing the bushing 60 before crimping and also in FIG. 7 showing the bushing 60 after crimping.

The first annular end portion 74 of bushing 60 is applied to the radially outer face 66a of the circumference of hole 64, and more precisely to the radially outer face 66a of the frustoconical portion 66 of the circumference of hole 64.

At each hole 64, a stud 62 is mounted around a bushing 60 and radially between a panel 38 and the first radial annular wall 24. This stud 62 is traversed by the bushing 60 and held by this one integral with a panel 38. This stud 62 comprises a radially outer annular face 84 of a shape substantially complementary to the radially inner face 66b of the frustoconical part 66 of the periphery of hole 64 of panel 38. In the present case, this radially outer annular face 84 of stud 62 is of frustoconical shape with a cross-section increasing radially outwards. It can be seen that stud 62 has an annular recess or counterbore 86 surrounding the bushing 60 and receiving the cylindrical rim 88 of the periphery of the hole 64. The free end of the cylindrical rim 68 of the circumference of the hole 64 is arranged at a distance, i.e., without contact with the bottom 90 of the recess, so that the support of the stud 62 on the circumference of the hole 64 is made at the radially outer annular face 84 of the stud 62 and not at the free end of the cylindrical rim 88 of the circumference of the hole 64. Stud 62 comprises a substantially flat annular surface 92 applied to a radially outer face of the first annular wall 24 of the upstream annular shroud 22.

Figure 7:
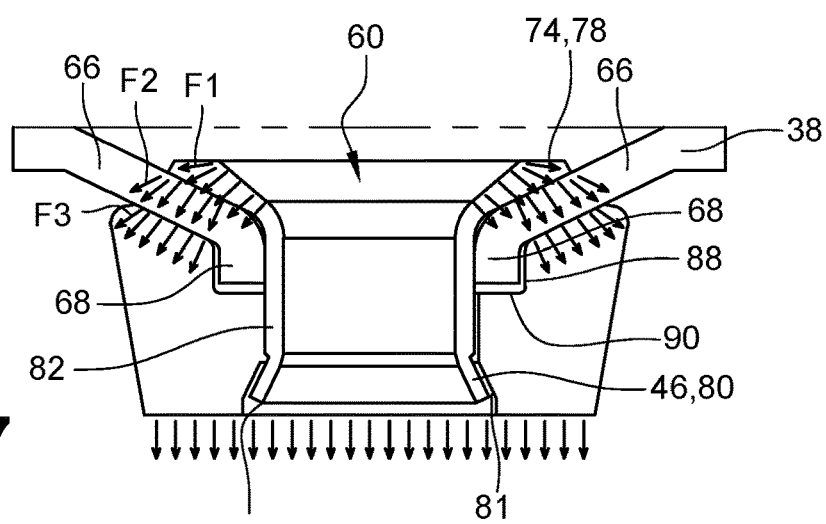
FIG. 7 is a schematic sectional view of a bushing mounted on a panel in an assembly according to the invention, the bushing being crimped on the stud.
Figure 8:
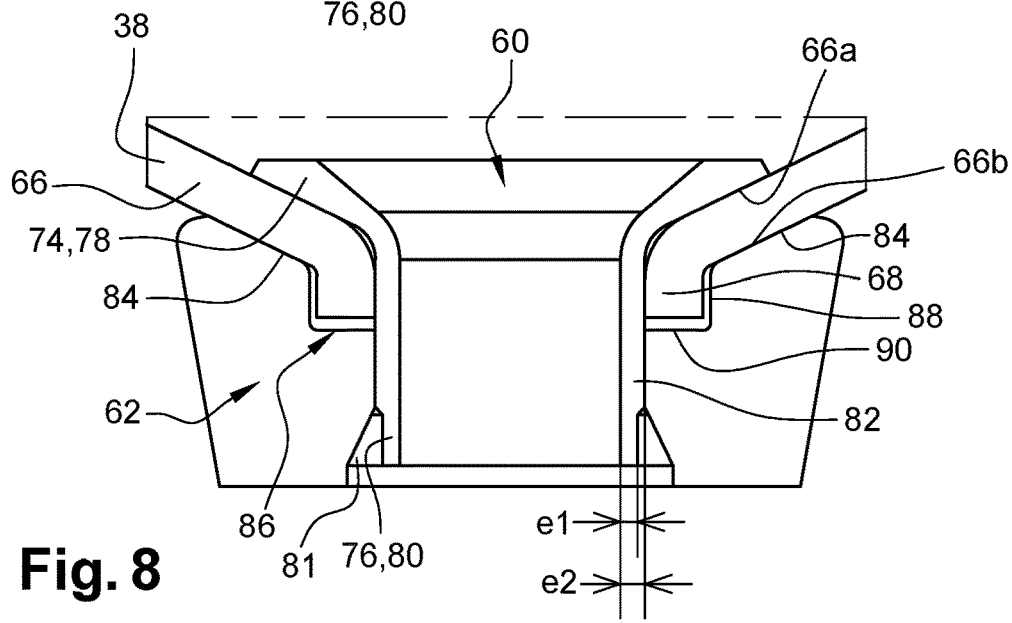
FIG. 8 is a schematic sectional view of a bushing mounted on a panel in an assembly according to the invention, the bushing not being crimped on the stud.

As it is clearly visible in FIGS. 4, 5 and 7, the second frustoconical skirt 80 of the bushing 60 is arranged radially opposite a corresponding annular surface 81 of the stud 62, here also frustoconical in shape, so as to ensure radial retention of the stud 62 on the panel 38. In this way, it is possible to pre-install the bushing 60 and the stud 62 on panel 38 by making these three parts integral with each other to allow simple handling of panel 38.

As shown in FIG. 8, the bushing 60 is installed so that its first frustoconical skirt 78 comes to rest on the radially external face of the frustoconical part 66 of the periphery of the hole 64, the second annular portion 76 of the bushing 60 then having a substantially cylindrical shape necessary for the introduction of the bushing 60 into the hole 64 of panel 38. The stud 62 is then mounted around the bushing 60 and the second annular portion 76 is crimped to form a frustoconical skirt 80 as described above.

The second skirt 80 frustoconical can present an angular opening of approximately 60°. The first frustoconical 78 skirt can present an angular opening higher than the angular opening of the second frustoconical 80 skirt, which can be of the order of 100° to 130° (FIGS. 4, 5 and 7).

More specifically, the mounting and crimping of the bushing 60 on stud 62 is carried out in such a way that the bushing has a clearance in the radial direction relative to panel 38 of about one tenth of a millimeter when the stud is in contact with the radially inner face of the frustoconical wall 66 of panel 38. This limits the mechanical stresses applied to the panel 38, particularly around the periphery of the hole 64 of the panel 38 and also to the stud 62 after crimping of the bushing 60. In practice, the crimping is carried out in such a way as to have an annular space between the second annular portion 76 or frustoconical skirt 80 and the annular surface 81 of the stud (FIG. 7).

When panel 38 is provided with the bushings 60 and the studs 62, it is mounted radially opposite the first annular wall 24 and screws 48 are inserted into the bushings 60, the head 70 of a screw coming to rest on the first frustoconical skirt 78 and its opposite end is screwed into a nut 50 crimped on the first annular wall 24 (FIG. 5).

FIG. 7 includes a plurality of arrows F1, F2, F3 which represent the clamping force applied to panel 38 which is observed to pass through and be distributed over the entire frustoconical part 66 of the periphery of hole 64, then passes through the frustoconical surface 84 of pad 62 and is then transmitted to the first annular wall 24.

Bushing 60 can be made of metallic material and stud 62 can be made of thermosetting resin.

The invention claimed is:

1. An assembly for a turbomachine (10) of longitudinal axis (A) comprising a first annular wall (24), panels (38) being arranged around the longitudinal axis (A) and extending radially opposite said first annular wall (24) so as to form a flow surface for a flow of air, each panel (38) being fixed to the first annular wall (24) by at least one fixing member (72) passing through an orifice (64) in the panel (38) and fixed to the first annular wall (24), characterized in that a bushing (60) is inserted in each orifice (64) and comprises a first annular end portion (74) applied to a face (66a) of the periphery of the orifice (64) opposite the first annular wall (24), the fixing member (72) clamping said first annular end portion (74) of the bushing (60) to the periphery of the orifice (64), a stud (62) forming a spacer surrounding the bushing (60) and being clamped radially between the periphery of the orifice (64) and the first annular wall (24), in which each first annular portion of the bushing (60) forms a frustoconical skirt (78) applied to a frustoconical part (66) of the periphery of the orifice (64) of the panel (38).

2. The assembly according to claim 1, wherein each bushing (60) comprises a second annular end portion (76) opposite the first annular end portion (74) and arranged radially opposite a corresponding surface (84) of the stud (62) for retaining the stud (62) on the panel (38).

3. The assembly according to claim 2, wherein the bushing (60) comprises a cylindrical portion (82) for joining the first annular end portion (74) and the second annular end portion (76).

4. The assembly according to claim 2, in which each first annular portion (74) of the bushing (60) forms a frustoconical skirt (78) applied to a frustoconical part (66) of the periphery of the orifice (64) of the panel (38).

5. The assembly according to claim 3, in which each first annular portion (74) of the bushing (60) forms a frustoconical skirt (78) applied to a frustoconical part (66) of the periphery of the orifice (64) of the panel (38).

6. The assembly according to claim 1, in which the frustoconical part (66) of the periphery of the orifice (64) of the panel (38) is extended by a cylindrical annular rim (68) whose free end is arranged at a distance from the stud (62), the frustoconical part (66) of the periphery of the panel (38) being clamped between the first annular end part (74) of the bushing (60) and the stud (62).

7. The assembly according to claim 1, in which the first annular end portion (74) and the second annular end portion (76) of the bushing (60) form frustoconical skirts (78, 80).

8. The assembly according to claim 2, in which the first annular end portion (74) and the second annular end portion (76) of the bushing (60) form frustoconical skirts (78, 80).

9. The assembly according to claim 3, in which the first annular end portion (74) and the second annular end portion (76) of the bushing (60) form frustoconical skirts (78, 80).

10. The assembly according to claim 1, in which the first annular end portion (74) and the second annular end portion (76) of the bushing (60) form frustoconical skirts (78, 80).

11. The assembly according to claim 6, in which the first annular end portion (74) and the second annular end portion (76) of the bushing (60) form frustoconical skirts (78, 80).

12. The assembly according to claim 1, in which the bushing (60) and the stud (62) are mounted with a play in radial translation relative to the panel, this play being of the order of a tenth of a millimeter.

13. The assembly according to claim 2, in which the bushing (60) and the stud (62) are mounted with a play in radial translation relative to the panel, this play being of the order of a tenth of a millimeter.

14. The assembly according to claim 3, in which the bushing (60) and the stud (62) are mounted with a play in radial translation relative to the panel, this play being of the order of a tenth of a millimeter.

15. The assembly according to claim 1, in which the bushing (60) and the stud (62) are mounted with a play in radial translation relative to the panel, this play being of the order of a tenth of a millimeter.

16. The assembly according to claim 1, wherein the panels (38) are made of a composite material comprising carbon fibers embedded in a thermosetting matrix.

17. The assembly according to claim 1, in which it comprises an annular shroud (22) formed by the first annular wall (24) arranged downstream of a second annular wall (26) and connected to the latter by a radial annular step (30), each panel (38) being arranged around the longitudinal axis (A) and extending in the downstream extension of the second upstream annular wall (26) of the annular shroud (22) so as to delimit a flow surface for an annular air flow.

18. A bypass turbomachine (10) comprising an assembly according to claim 17, in which the second annular wall (26) carries radially outwardly extending stator vanes (28), the first annular wall (24) being fixed to an intermediate casing (16) to which the downstream end of each panel (38) is also fixed, the second annular wall (26) and the panels (38) delimiting radially inwardly an annular flow path (20) for a secondary air flow.

19. A turbomachine (10) according to claim 18, wherein each panel (38) is arranged circumferentially between radial arms (40) of the intermediate casing (16).

* * * * *